UNITED STATES PATENT OFFICE.

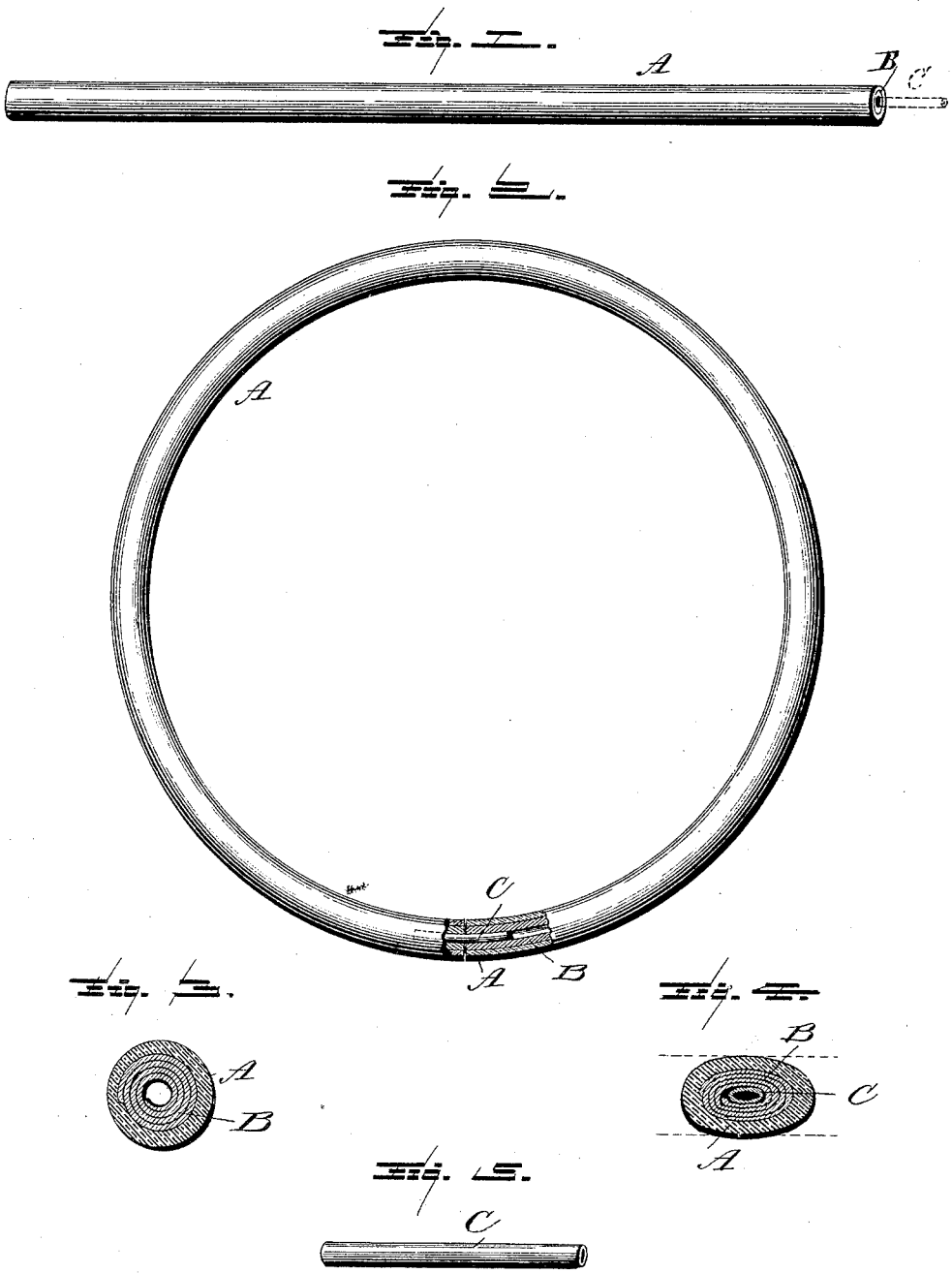

EDWARD L. PERRY, OF PATERSON, NEW JERSEY.

STEAM-JOINT PACKING.

SPECIFICATION forming part of Letters Patent No. 462,278, dated November 3, 1891.

Application filed June 5, 1891. Serial No. 395,216. (No model.)

*To all whom it may concern:*

Be it known that I, EDWARD L. PERRY, a citizen of the United States, residing at Paterson, in the county of Passaic and State of New Jersey, have invented certain new and useful Improvements in Steam-Joint Packing; and I do hereby declare that the following is a full, clear, and exact description of the same, reference being had to the annexed drawings, making a part of this specification, and to the letters of reference marked thereon.

Figure 1 of the drawings represents a view of my improved steam-joint packing previous to the ends being connected together by the tubular coupling. Fig. 2 represents a plan view, partly in section, showing the two ends of the packing connected together; Fig. 3, a cross-section through the packing; Fig. 4, a similar view showing the packing and coupling-tube compressed; Fig. 5, a detail view in perspective of the coupling-tube.

The present invention has relation to that class of steam-packing or gaskets for hand-holes, man-holes, cylinder-heads, and in other places where a packing of this description would be found useful; and it consists in a packing constructed substantially as shown in the drawings, and hereinafter described and claimed.

In the accompanying drawings, A represents the outer covering, of rubber compound or other suitable elastic material, and B the core of cotton-duck or other well-known woven fabrics wound in layers to form the core of the desired size. It is necessary for the more perfect construction of the packing and to render it sufficiently strong to resist the pressure of the steam and prevent blowing out to form the core of a woven fabric which possesses the requisite strength and durability for the purpose intended.

The packing above described may be round, oval, square, or of any other preferred shape in cross-section and any diameter as found most desirable, such changes coming within ordinary mechanical skill, and I therefore reserve the right to make them without departing from the principle of my invention.

In order to secure the compression of the packing more readily, the core B is made hollow, which also provides means for attaching the ends of the hollow coupling-tube C to join the two ends of the packing together, after which the joint thus made is covered with a piece of suitable material. The coupling-tube is preferably of metal, but other material may be used, and is made hollow to enable it to be compressed with the packing.

Although it is considered materially advantageous to have the coupling in the form of a hollow tube, a solid coupling may be used, but possibly not with as good results.

Having now fully described my invention, what I claim as new, and desire to secure by Letters Patent, is—

A steam-joint packing consisting of a hollow core of cotton-duck or other woven fabric, a covering of elastic material, and a coupling the ends of which enter the ends of the packing, substantially as and for the purpose specified.

In testimony that I claim the above I have hereunto subscribed my name in the presence of two witnesses.

EDWARD L. PERRY.

Witnesses:
CHAS. H. FOWLER,
WM. H. DELACY.